United States Patent [19]

Niwa

[11] Patent Number: 4,788,481
[45] Date of Patent: Nov. 29, 1988

[54] NUMERICAL CONTROL APPARATUS

[75] Inventor: Tomomitsu Niwa, Aichi, Japan

[73] Assignee: Mitsubishi Denki Kabushiki Kaisha, Tokyo, Japan

[21] Appl. No.: 24,216

[22] Filed: Mar. 10, 1987

[30] Foreign Application Priority Data

Mar. 10, 1986 [JP] Japan .................................. 61-50322

[51] Int. Cl.$^4$ ......................... G06F 3/14; G06F 15/46
[52] U.S. Cl. ................................... 318/600; 318/565; 318/577; 364/474.02; 364/474.26
[58] Field of Search ............... 318/600, 565, 566, 567, 318/569, 570, 571, 572, 573, 574, 575, 576, 577, 608; 364/167, 168, 169, 188, 474, 475, 476, 131, 132, 171, 191, 174, 757

[56] References Cited

U.S. PATENT DOCUMENTS

| 4,118,660 | 10/1978 | Ohtsuki et al. | 318/571 |
| 4,266,169 | 5/1981 | Holzler et al. | 318/565 X |
| 4,412,121 | 10/1983 | Kremers et al. | 318/577 X |
| 4,519,026 | 5/1985 | Nozawa et al. | 364/131 X |
| 4,558,419 | 12/1985 | Kanematsu et al. | 364/474 |
| 4,559,600 | 12/1985 | Rao | 364/474 |
| 4,575,805 | 3/1986 | Moermann et al. | 364/474 |
| 4,586,125 | 4/1986 | Takagawa | 318/567 X |
| 4,597,040 | 6/1986 | Buizer | 364/474 X |
| 4,631,465 | 12/1986 | Fukuyama et al. | 318/565 |
| 4,665,493 | 5/1987 | Hattori | 364/475 X |
| 4,680,719 | 7/1987 | Kishi et al. | 364/474 |
| 4,694,153 | 9/1987 | Bejczy et al. | 318/577 X |

FOREIGN PATENT DOCUMENTS 0089561 9/1983 European Pat. Off. .

OTHER PUBLICATIONS

Donald C. Beran, Numerical Control Programming Via Computer Graphics, 56–71.

Primary Examiner—William M. Shoop, Jr.
Assistant Examiner—Paul Ip
Attorney, Agent, or Firm—Sughrue, Mion, Zinn, Macpeak, and Seas

[57] ABSTRACT

A numerical control apparatus comprising a display device capable of displaying not only the configuration of a workpiece to be machined and the machining paths of machining tools relative to the workpiece but also the movement of the workpiece as a machining path of relative movement of the machining tool with respect to a stationary workpiece. The machining path of the relative movement of the machining tool is obtained based on data representing the movement of the workpiece per se.

4 Claims, 10 Drawing Sheets

FIG. 8
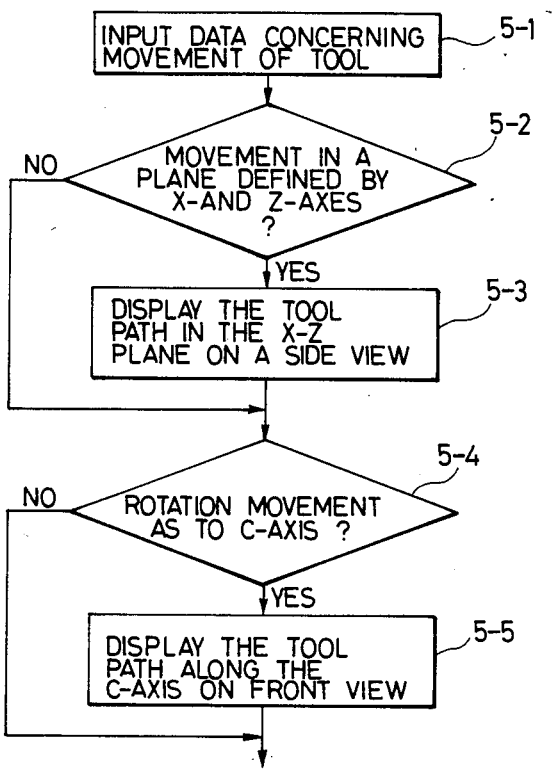
FIG. 9  FIG. 10  FIG. 11
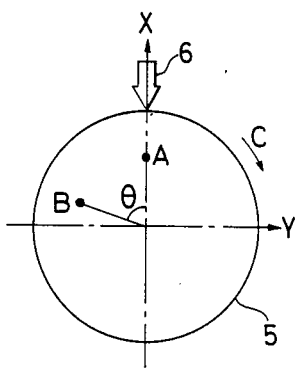 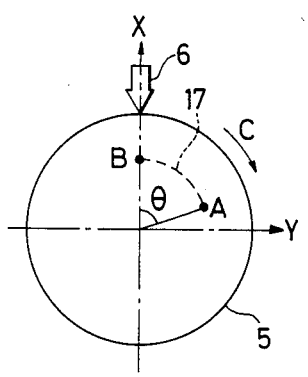 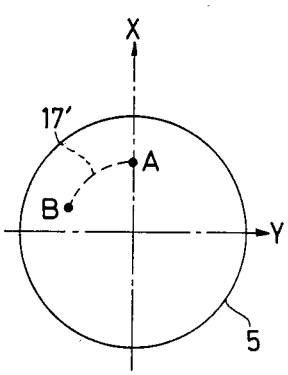

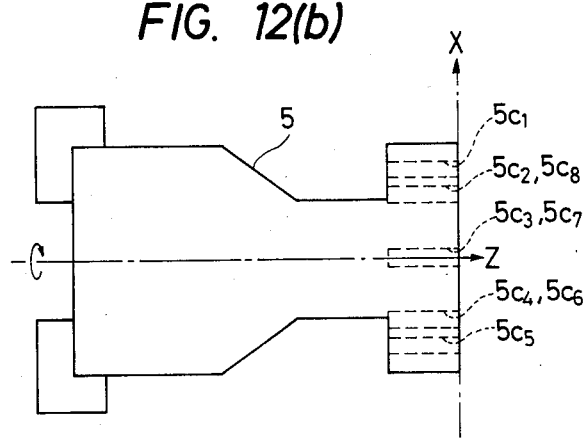
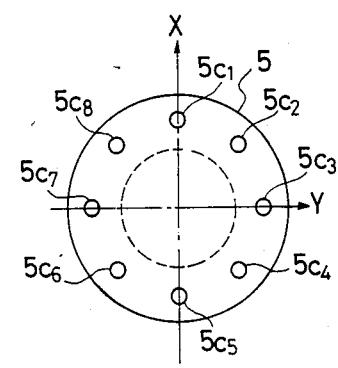
FIG. 12(b)  FIG. 12(a)
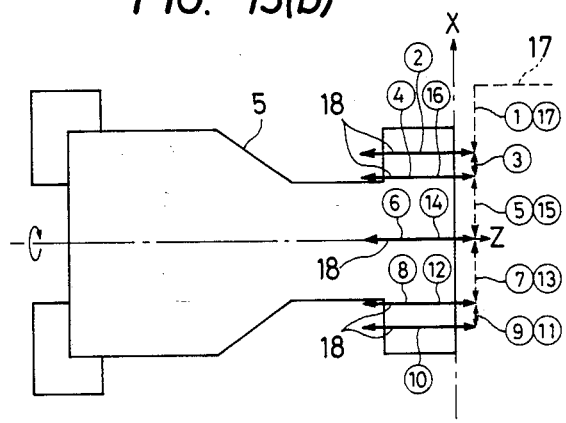
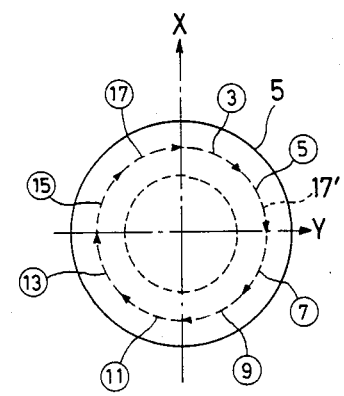
FIG. 13(b)  FIG. 13(a)
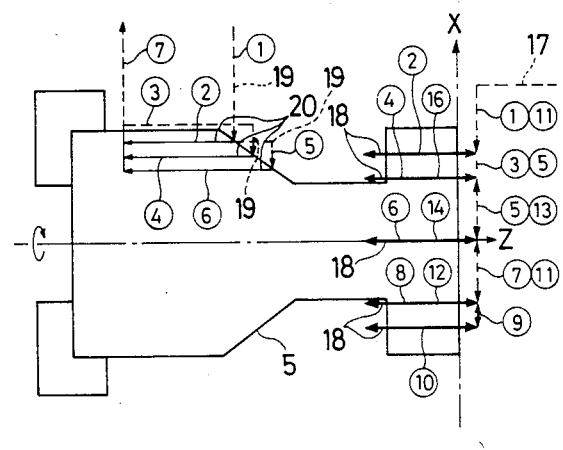
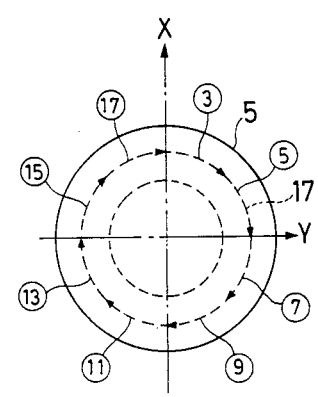
FIG. 14(b)  FIG. 14(a)

NUMERICAL CONTROL APPARATUS

FIELD OF THE INVENTION

The present invention relates to a numerical control apparatus that controls the position of a machining tools relative to a workpiece to be machined by providing a relevant numerical command so as to achieve easy, precise and efficient machining of the workpiece into a complex shape. More particularly, the invention relates to a numerical control apparatus having a display system which is adapted to display the movement of the tool relative to the workpiece based on the numerical command in a simulation mode or in a real-time display mode.

BACKGROUND OF THE INVENTION

FIG. 1 shows an example of a conventional machining apparatus having a rotating shaft (c-axis) that is controlled by a numerical control apparatus; this apparatus is a kind of a composite lathe that continuously performs not only lathing but also milling the workpiece such as drilling. In FIG. 1, reference numeral 1 denotes an induction motor, 2, a servo motor; 3, a main shaft (c-axis); 5, a workpiece mounted on the main shaft 3; 6, a drill; 7, a device for driving the drill 6 which is detachably mounted thereon; 9, a cutting tool and 10, a turret for controlling the movement in directions of X- and Z-axes, of the drill 6, device 7 and cutting tool 9.

Machining operation of the composite lathe shown in FIG. 1 will be hereinafter described with reference to FIG. 2. illustrating an example of the finished configuration of the workpiece.

In order to permit the composite lathe to work as a lathe, the induction motor 1 is first coupled to the main shaft 3 so as to rotate the workpiece 5 at a rotation speed determined by an applied command. Then, the cutting tool 9 is mounted on the turret 10 and lathes the workpiece 5 to provide portions 5a and 5b as shown in FIG. 2, with its movement in the directions of X- and Z-axes being controlled by a numerical control apparatus NC 21 connected to the lathe. Subsequently, in order to shift the operation mode to a continuous milling operation, the shaft 3 is then coupled to the servo motor 1 and the position of the workpiece 5 is numerically controlled by rotating the shaft (C-axis) serving as a positioning control rotating shaft according to a control command from the numerical control apparatus NC 21. In this case, the drill 6 is mounted on the device 7 and is allowed to rotate at a high speed. Under the control of the numerical control apparatus NC 21, the main shaft 3 is rotated in a predetermined direction by an increment of 45 degrees so that it will be successively positioned for the eight holes 5c1 to 5c8 shown in FIG. 2. After the main shaft 3 has been positioned in such a way as described above, the workpiece 5 is milled to produce the finished shape shown in FIG. 2, with the movement of turrent 10 in the directions of Z- and Y-axes being controlled by the NC 21.

A numerical control apparatus conventionally used to control the operation of the above-described composite lathe is provided with a CRT display 14a capable of displaying the machining path of the cutting tool 9 thereon as shown in FIG. 3. However, the machining path of a tool such as a drill used in milling whose movement is accompanied by the corresponding motion of the C-axis, is not displayed on the CRT display 14a. This results in a difficulty for the operator to check the progress of milling the workpiece as to the type of hole being drilled (i.e., whether it is a through-hole or a blind hole) or the depth of groove being formed.

SUMMARY OF THE INVENTION

An object, therefore, of the present invention is to provide a numerical control apparatus that is free from the problems described above and which is capable of displaying the configuration of a workpiece according to a command signal from a CPU and further displaying the machining paths of tools, instead of the movement of the workpiece. The display of the machining path is accomplished according to data as to the movement of the machining tools relative to the workpiece to be machined, which is obtained based on a movement command signal for the workpiece.

BRIEF DESCRIPTION OF THE DRAWINGS

FIG. 8 is a flowchart for displaying the machining paths relative to the workpiece;

FIGS. 9, 10 and 11 are schematic explanatory diagrams for description with respect to the display of a tool path with the rotation movement of the workpiece about a C-axis;

FIGS 12(a) and 12(b) are diagrams showing front and side views of the workpiece displayed, respectively;

FIG. 13(a) and FIG. 13(b) are diagrams showing the machining paths of a machining tool such as a drill on the front and side views shown in FIGS. 12(a) and 12(b), respectively;

FIG. 14(a) and FIG. 14(b) are diagrams showing the machining paths of machining tools such as a cutting tool and the drill on the front and side views shown in FIGS. 12(a) and 12(b), respectively.

DESCRIPTION OF THE PREFERRED EMBODIMENT

An embodiment of the present invention is hereinafter described with reference to the accompanying drawings.

Figure 1:
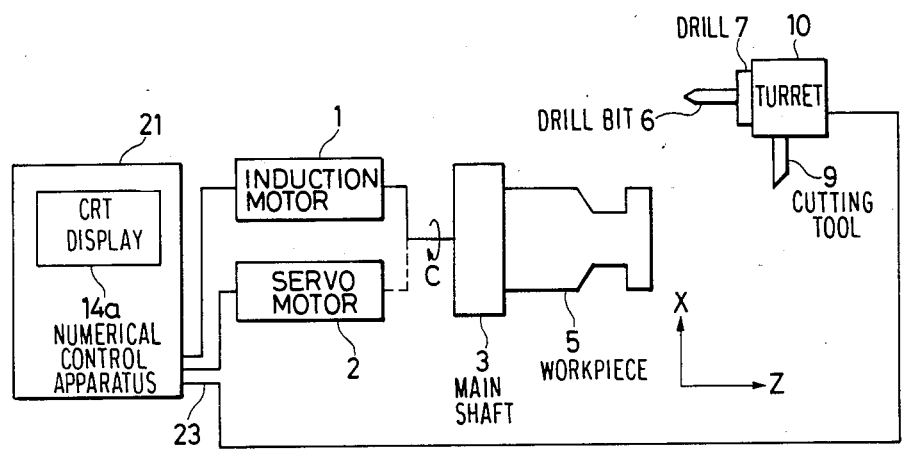
FIG. 1 is a diagram briefly showing an example of a conventional composite lathe which is controlled by an numerical control (NC) apparatus.
Figure 2:
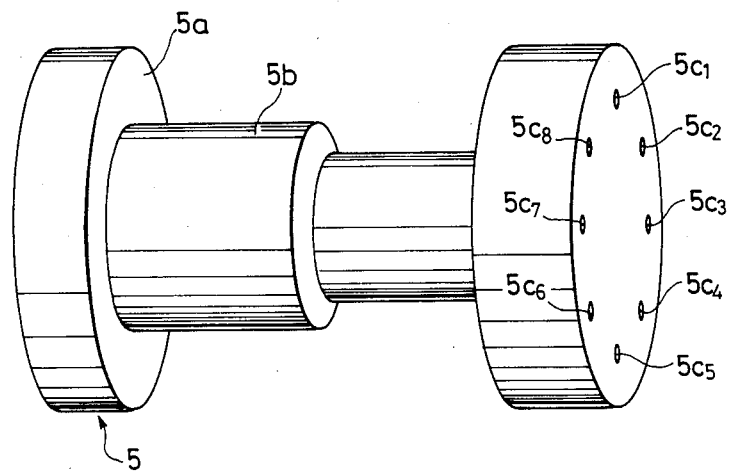
FIG. 2 is a diagram illustrating a perspective view of an example of the finished configuration of a workpiece.
Figure 3:
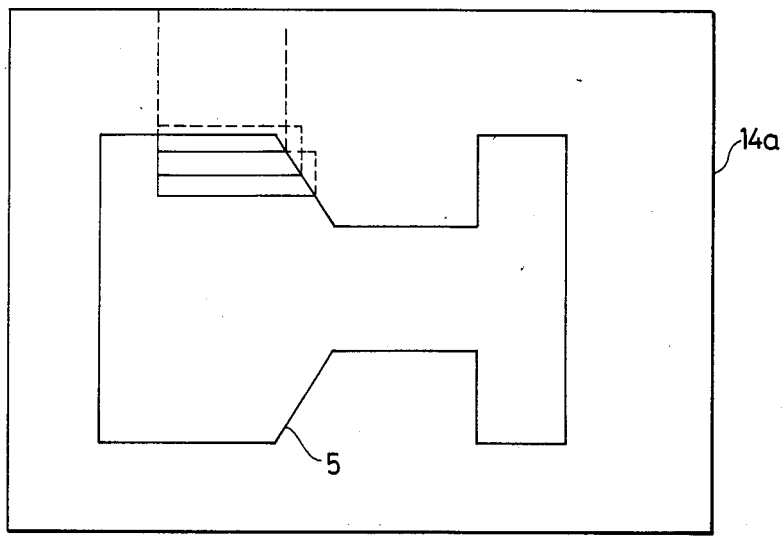
FIG. 3 is a diagram showing an example of a display on a conventional display device of the NC apparatus.
Figure 4:
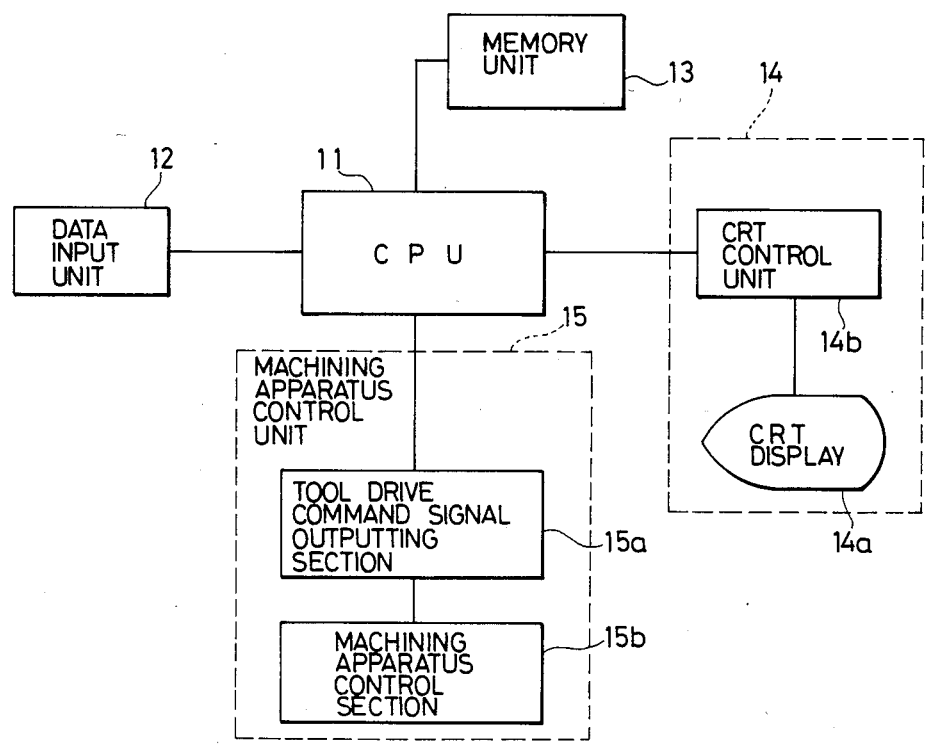
FIG. 4 is a block diagram of an example of a numerical control (NC) apparatus according to the present invention.

FIG. 4 is a block diagram of a numerical control apparatus according to the present invention. In the figure, reference numeral 11 denotes a central processing unit (hereunder abbreviated as CPU); 12, a data inputting unit for inputting to the CPU 11 numerical data on the configuration of a workpiece to be machined and the machining paths of tools relative to the workpiece, the numerical data being supplied from a programming unit (not shown); 13, a memory unit for storing numerical data from the CPU 11; 14, a geometric figure display unit which, in response to a command signal from the CPU 11, displays the configuration of the workpiece 5 and the machining paths of the machining tool relative to the workpiece 5, the display unit 14 including a CRT display 14a and a CRT control unit 14b; and 15, a machining apparatus control unit for controlling a machining apparatus such as a composite lathe on the basis of the command signal from the CPU 11, the control unit 15 including a tool drive command signal outputting section 15a and a machining apparatus control section 15b.

Figure 5A:
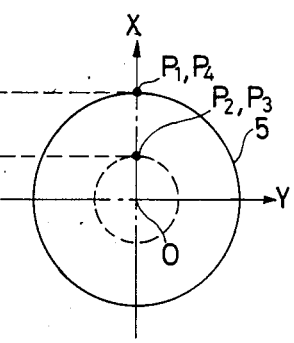
FIGS. 5(a) and 5(b) are diagrams showing front and side views of a workpiece displayed on a display device, respectively.
Figure 5B:
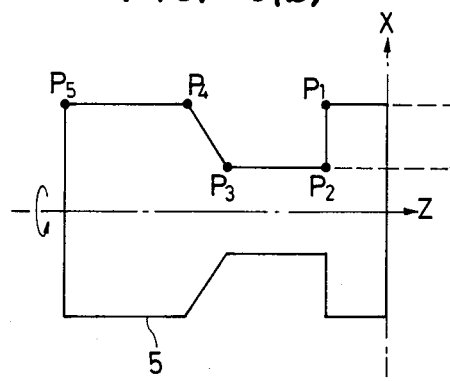

The numerical data to be inputted to the CPU 11 that indicates the outer configuration of the workpiece 5, includes five coordinate (X, Z) values, P1(X1, Z1), P2 (X2, Z2), P3(X3, Z3), P4(X4, Z4) and Pr(X5, Z5), for instance, specifying five points of the workpiece. In case of displaying the configuration of the workpiece 5 on the basis of these coordinate values thus inputted, a side view of the workpiece 5 is obtained by connecting the respective points, P1, P2, P3, P4 and P5, with straight lines as shown in FIG. 5(b), while a front view of the workpiece is obtained by a combination of two circles whose radii represent the distances of the respective points from the Z-axis, as shown in FIG. 5(a).

Figure 6A:
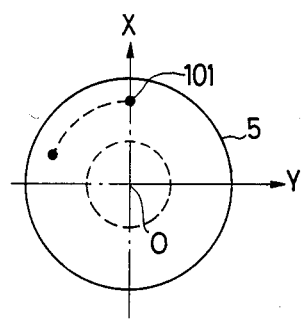
FIGS. 6(a) and 6(b) are diagrams showing the machining paths of machining tools superimposed on the front and side views shown in FIGS. 5(a) and 5(b), respectively.
Figure 6B:
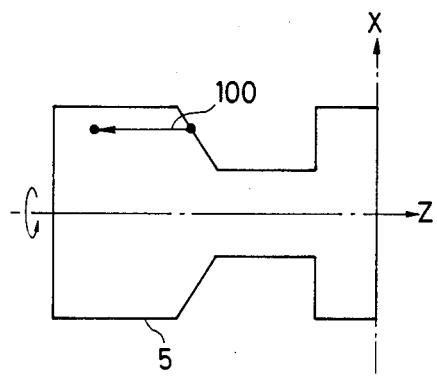

An example of the numerical data indicating the machining path of the tool is as follows:

```
G1 X 2000   Z - 3000
            Z - 6000
            .
            .
            .
``` which means that the lathing operation is effected from the start point (X=2000, Z=−3000) to the end point (X =2000, Z=−6000). If the machining path is to be displayed on the basis of this numerical data, the machining paths are shown as if they move on a straight line 100 as shown in FIG. 6(b) and along a dotted arc 101 in a plane defined by X- and Z-axes as shown in FIG. 6(a). The center of the arc is located at the origin O of the X-Y coordinate system.

Figure 7A:
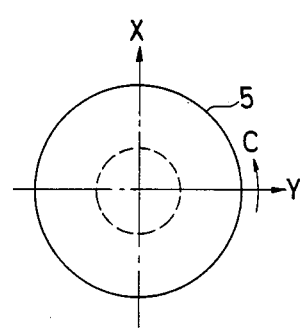
FIGS. 7(a) and 7(b) are diagram showing the front and side views of the workpiece displayed on the display device, respectively.
Figure 7B:
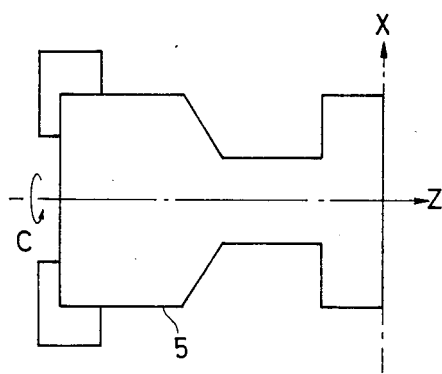

FIGS. 7(a) and 7(b) show the configuration of the workpiece 5 that is displayed on the CRT display unit 14a in response to a command signal from CPU 11. FIG. 7(a) and FIG. 7(b) are a front view and a side view, respectively.

FIG. 8 is a flowchart for superimposing the machining paths on the displayed workpiece 5. First, the data inputting unit 12 supplies to the CPU 11 data concerning the movement of the tool with respect to X-, Z- and C-axes (step 5-1). Then, the CPU 11 determines whether a relative movement of the tool in a plane defined by the X- and Z-axes is required or not (step 5-2). If yes, the CPU 11 causes the display unit 14 to display on the workpiece shown in FIG. 7(b) the machining path of the tool which is as shown by the straight line 100 including both the start and end points of the movement of the tool in FIG. 6(b), (step 5-3).

The CPU 11 then determines whether a rotation movement about the C-axis (rotating axis) is required or not (step 5-4) and, if yes, the CPU causes the display unit 14 to display on the workpiece shown in FIG. 7(a) the maching path of the tool which is as shown by the dotted arc 101 in FIG. 6(a).

In the actual case of milling, the workpiece 5 itself rotates but the display of the rotating of the workpiece on CRT display is not practical since data processing therefor is quite time-consuming. Therefore, the CPU 11 used in the present invention does not provide an image of the rotating workpiece 5 but instead thereof provides the position of the tool and the machining path thereof relative to the stationary workpiece. In other words, the tool, rather than the workpiece 5, is shown rotating on the CRT display 14a.

FIG. 9 shows the case where the position of the tool 6 relative to the workpiece 5 is changed by rotating the workpiece 5 about the C-axis by an angle $\theta$. In the actual case, the tool 6 moves along the path that is indicated by the dotted arc 17 shown in FIG. 10 but, as already mentioned, the display of the rotating of the workpiece 5 by an angle $\theta$ on the display unit 14a is quite time-consuming because of the complicated procedures for performing the necessary data processing. This problem can be solved by depicting the machining path as indicated by the dashed curve 17' shown in FIG. 11 where the tool 6 is shown as if it were rotating instead of the workpiece 5.

FIG. 12(a) and FIG. 12(b) show the front and side views of a workpiece that is to be machined with a composite lathe. It is assumed here that drilling is done on the front side of the workpiece 5 to make through-holes 5c1 to 5c8. The machining paths employed in this case will be displayed as shown in FIGS. 13(a) and (b).

In FIG. 13(a) and FIG. 13(b), two paths are indicated by the reference numerals 17' and 18; the dotted circular path 17' represents a positioning path while the solid path 18 represents the drilling path. The order of the movement of the tool is indicated by a sequence starting with (1) and ending with (17).

As described above, when the NC apparatus of the present invention is used to display the machining path of a tool provided to an apparatus including the rotating axis C, the tool itself, rather than the workpiece 5, is displayed on the display unit as if it were rotating. Consequently this results in great ease in processing data for visual display of machining. If this NC apparatus is used to control the operation of a composite lathe, the paths 19 and 20 employed for lathing and the paths 17' and 18 for milling (the dashed line 17' representing a positioning path and the solid line 18 representing a machining path) can be simultaneously displayed on the display unit, as illustrated in FIGS. 14(a) and 14(b).

In the embodiment described above, the apparatus of the present invention displays the machining path realized in machining with a composite lathe, but it should be noted that this apparatus can also be used in displaying the machining path of a rotating shaft as found in a machining center.

According to the NC apparatus of the present invention which employs a geometric figure displaying unit, it is possible to display not only the configuration of the workpiece but also the paths of tools instead of the movement of the workpiece. Since the moving workpiece is displayed in a still mode, the operator has easy access to the progress and the condition of machining from the display.

What is claimed is:

1. A numerical control apparatus comprising:
   a data inputting means for inputting data representing the configuration of a workpiece to be machined, machining paths of machining tools relative to said workpiece and the movement of said workpiece;
   a memory means for storing said data inputted by said data inputting means;
   a display means for displaying the configuration of said workpiece and said machining path according to said data read out from said memory means; and
   a central processing unit for controlling the operation of said memory means and for controlling said display means so as to display not only the configuration of said workpiece and the machining paths of said machining tools relative to said workpiece, but also the movement of said workpiece as a machining path, said movement of said machining tool being relative to a stationary workpiece, data representing said machining path of relative movement of said machining tool being obtained based on said data representing the movement of said workpiece.

2. The numerical control apparatus as defined in claim 1 wherein said workpiece is machined by a composite lathe which is capable of at least lathing and milling.

3. The numerical control apparatus as defined in claim 2 wherein said milling operation is drilling.

4. The numerical control apparatus as defined in claim 1 wherein said machining paths of said machining tools are superimposed on the display for the configuration of said workpiece in said display means.

* * * * *